United States Patent
Schnittger et al.

(10) Patent No.: US 10,730,500 B2
(45) Date of Patent: Aug. 4, 2020

(54) PARKING BRAKE DEVICE FOR A UTILITY VEHICLE

(71) Applicant: KNORR-BREMSE Systeme fuer Nutzfahrzeuge GmbH, Munich (DE)

(72) Inventors: Karsten Schnittger, Munich (DE); Fabian Griesser, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 16/359,317

(22) Filed: Mar. 20, 2019

(65) Prior Publication Data

US 2019/0217839 A1     Jul. 18, 2019

Related U.S. Application Data

(63) Continuation of application No. PCT/EP2017/071160, filed on Aug. 22, 2017.

(30) Foreign Application Priority Data

Sep. 21, 2016 (DE) .................. 10 2016 117 784

(51) Int. Cl.
*B60T 8/34* (2006.01)
*B60T 13/68* (2006.01)
(Continued)

(52) U.S. Cl.
CPC .............. *B60T 13/683* (2013.01); *B60T 7/20* (2013.01); *B60T 13/662* (2013.01); *B60T 13/68* (2013.01)

(58) Field of Classification Search
CPC ...... B60T 13/662; B60T 13/683; B60T 15/18; B60T 15/182; B60T 17/04; B60T 17/221
(Continued)

(56) References Cited

U.S. PATENT DOCUMENTS 8,297,712 B2 * 10/2012 Bensch ................. B60T 13/683
                                                           303/3
9,157,543 B2 * 10/2015 Herges ................. B60T 17/221
(Continued)

FOREIGN PATENT DOCUMENTS

DE    10 2007 008 504 A1    8/2008
DE    10 2007 061 908 A1    6/2009
(Continued)

OTHER PUBLICATIONS

Korean-language Office Action issued in Korean Application No. 10-2019-7010753 dated Mar. 12, 2020 with English translation (12 pages).

(Continued)

*Primary Examiner* — Christopher P Schwartz
(74) *Attorney, Agent, or Firm* — Crowell & Moring LLP

(57) ABSTRACT

A parking brake device for a utility vehicle includes at least one control valve device, at least one relay valve, at least one pneumatic brake device and at least one trailer control module. The relay valve is controllable by the control valve device, and at least the pneumatic brake device can be actuated by the relay valve. Upstream of the trailer control module, another valve includes a first connector, a second connector and a third connector. A second connecting line is connected to the second connector and to the control valve device. A third connecting line is connected to the third connector and to the trailer control module. A first connecting line is connected to the first connector and to a first line arranged downstream of the relay valve.

8 Claims, 5 Drawing Sheets

(51) Int. Cl.
   *B60T 7/20* (2006.01)
   *B60T 13/66* (2006.01)
(58) Field of Classification Search
   USPC ............... 188/3 H, 151 R, 152; 137/625.25,
   137/625.26; 251/129.01; 303/3, 7, 8,
   303/9.76, 15, 20, 118.1, 123, 127
   See application file for complete search history.

(56) References Cited

U.S. PATENT DOCUMENTS

| | | | |
|---|---|---|---|
| 2010/0025141 A1* | 2/2010 | Bensch | B60T 8/327 180/271 |
| 2010/0187902 A1 | 7/2010 | Bensch et al. | |
| 2011/0147141 A1* | 6/2011 | Schnittger | B60T 15/18 188/152 |
| 2014/0103237 A1 | 4/2014 | Herges | |

FOREIGN PATENT DOCUMENTS

| | | |
|---|---|---|
| DE | 10 2009 059 816 B3 | 4/2011 |
| DE | 10 2011 101 438 A1 | 11/2012 |
| DE | 10 2013 006 860 A1 | 10/2014 |
| DE | 10 2015 106 144 A1 | 10/2016 |
| EP | 0 268 045 B1 | 5/1989 |
| EP | 1 785 325 A1 | 5/2007 |
| EP | 1 509 434 B1 | 8/2010 |
| EP | 2 238 004 B1 | 9/2011 |
| KR | 10-2015-0041611 A | 4/2015 |
| WO | WO 2008/101592 A2 | 8/2008 |
| WO | WO 2011/147861 A1 | 12/2011 |

OTHER PUBLICATIONS

International Search Report (PCT/ISA/210) issued in PCT Application No. PCT/EP2017/071160 dated Oct. 20, 2017 with English translation (five (5) pages).
German-language Written Opinion (PCT/ISA/237) issued in PCT Application No. PCT/EP2017/071160 dated Oct. 20, 2017 (eight (8) pages).
German-language Office Action issued in counterpart German Application No. 10 2016 117 784.9 dated Aug. 9, 2017 (10 pages).
International Preliminary Report on Patentability (PCT/IB/326 & PCT/IB/373) issued in PCT Application No. PCT/EP2017/071160 dated Apr. 4, 2019, including English translation of document C2 (German-language Written Opinion (PCT/ISA/237) previously filed on Mar. 20, 2019) (10 pages).
English Translation of Hindi-language Search Report issued in Indian Application No. 201937011312 dated May 27, 2020 (eight (8) pages).

* cited by examiner

US 10,730,500 B2

PARKING BRAKE DEVICE FOR A UTILITY VEHICLE

CROSS REFERENCE TO RELATED APPLICATIONS

This application is a continuation of PCT International Application No. PCT/EP2017/071160, filed Aug. 22, 2017, which claims priority under 35 U.S.C. § 119 from German Patent Application No. 10 2016 117 784.9, filed Sep. 21, 2016, the entire disclosures of which are herein expressly incorporated by reference.

BACKGROUND AND SUMMARY OF THE INVENTION

The present invention relates to a parking brake device for a utility vehicle having at least one control valve device, having at least one relay valve, having at least one pneumatic brake device and having at least one trailer control module, wherein the relay valve is controllable by means of the control valve device, and wherein at least the pneumatic brake device is activatable by means of the relay valve.

Parking brakes of utility vehicles including trailers and rail vehicles are regularly nowadays provided with spring brake actuators which, in the release position, subject a spring compression space to compressed air and thereby keep the spring tensioned, while, for braking when parking, the spring compression space is vented, i.e. is connected to atmospheric pressure, and thus the brake actuator generates a braking force under the action of the spring (cf. Bosch, Kraftfahrtechnisches Taschenbuch [Automotive pocket book], 22nd edition, Dusseldorf, 1995, page 648).

Purely pneumatically operated parking brakes which are operated by generally bistable parking brake valves to be actuated by the driver, and electro-pneumatic systems having a bistable electromechanical valve which is controlled by an electromechanical bistable solenoid valve, are known. The two valve positions for "parking brake" and "release" have to be "stable" here, i.e. remain in the respectively selected position without action of a person. The same also applies to a failure of an electrical current supply for the solenoid valves.

DE 10 2009 059 816 A1 has already disclosed a parking brake device of the type in question for motor vehicles, in which the trailer control modules are arranged in the region of the control lines to the service brake of the motor vehicle.

The varying behavior of the electric parking brake depending on the vehicle-specifically differing lengths of tubing from the control space to the trailer control modules is a disadvantage of the previous prior art.

DE 10 2013 006 860 A1 has furthermore disclosed a pneumatic system for motor vehicles, in which, for example in conjunction with a parking brake device of the type in question, a solenoid valve for preparation of the air is also used at the same time for realizing what is referred to as a trailer test function for activating a trailer control module.

Since the line length to the trailer control valve varies in different types of vehicle, the volume of the control line for the electronic parking brake can therefore also be subject to said fluctuations. There can therefore be a small volume of the control line, which results in a rapid buildup of pressure and dissipation of pressure in the control line. If, however, there is a large volume of the control line, a slower buildup of pressure and dissipation of pressure in the control line arises. The regulation behavior of the electronic parking brake is therefore complicated and difficult to coordinate in order to ensure satisfactory operation.

It is therefore the object of the present invention to develop a parking brake device for a utility vehicle of the type mentioned at the beginning in an advantageous manner, in particular to the effect that the regulation behavior of a parking brake device, in particular of an electronic parking brake, can be configured so as to be able to be coordinated more simply and so as to be able to be adjusted more easily, and also, furthermore, the activation of the trailer and of the brake device thereof can be configured more simply.

This object is achieved according to the invention by a parking brake device for a utility vehicle having at least one control valve device, having at least one relay valve, having at least one pneumatic brake device and having at least one trailer control module, wherein the relay valve is controllable by the control valve device, and wherein at least the pneumatic brake device is activatable by the relay valve, wherein a valve which has a first connection and a second connection and a third connection is provided upstream of the trailer control module, wherein a second connecting line connecting the valve to the control valve device is connected to the second connection, wherein a third connecting line connecting the trailer control module to the valve is connected to the third connection, wherein a first connecting line which is attached to a first line arranged downstream of the relay valve is connected to the first connection.

The parking brake device for a utility vehicle can be in particular an electronic parking brake device for a utility vehicle.

The invention is based on the basic concept that it is sufficient for the activating of the parking brake function of the trailer control module to activate the control connection of the trailer control module for activating the parking brake device of a trailer of the utility vehicle for the driving mode and parking mode exclusively via the pressure prevailing behind the relay valve in the feed lines to the spring accumulators of the parking brake, i.e. essentially via the pressure from the spring accumulators of the parking brake of the utility vehicle. A connection to the control lines for activating the relay valve can therefore be omitted, and a simpler design is thereby possible. The line to the trailer control valve, which line can have different lengths for different vehicles or types of vehicle, is therefore no longer coupled to the control line of the relay valve, but rather to the spring accumulators. The control volume for the parking brake device can therefore have a constant value. The regulation of the parking brake device can therefore be simplified. In addition, the line length to the trailer control module can be varied with fewer restrictions.

The second connecting line connects the valve in particular directly to the control valve device (i.e., for example, a further valve is no longer arranged in the second connecting line between valve and control valve device).

The valve can be a 3/2-way valve.

Furthermore, it can be provided that the valve is a solenoid valve. This permits a precisely adjustable characteristic of the valve and reliable operation of the valve. In addition, the use or installation of valves of this type is cost-effective.

Furthermore, it is conceivable for the valve to be activated pneumatically. The requirement for the valve can be realized with said standard design. The use of standard components is cost-effective and, in addition, is also of advantage with regard to durability.

The valve can have a first control connection, wherein the first control connection is connected to the second connecting line by a first branch line. It is thereby possible to use the pressure in the second connecting line also for activating the valve. If the pressure in the second connecting line exceeds a specifiable or specified threshold value, the valve switches. It can be provided that the valve is kept in this position until the pressure which is present lies above the threshold value. In principle, however, it would also be conceivable for the valve to be kept stably in this position and for switching the valve to take place only by application of another control signal to another control connection of the valve.

Furthermore, it can be provided that the valve has a second control connection, wherein the second control connection is connected to the first connecting line by a second branch line. Analogously as in the first control connection, it is thereby possible also to use the pressure in the first connecting line for activating the valve. If the pressure in the first connecting line exceeds a specifiable or specified threshold value, the valve switches. It can be provided that the valve is kept in this position for as long as the pressure which is present lies above the threshold value. In principle, however, it would also be conceivable for the valve to be kept stably in this position and for switching of the valve to take place only by application of another control signal to another control connection of the valve.

In addition, it can be provided that the valve has at least one first switching state in which the first connection is connected to the third connection in such a manner that the pressure from the first connecting line is present at a control connection of the trailer control module. This affords the advantage that, in this state, the valve is connected exclusively pneumatically to that region of the parking brake device which lies downstream of the relay valve. This results in a decoupling of the line system of the parking brake device, said line system lying upstream of the relay valve and serving for activating the (bistable) control valve device and also the relay valve. The line length or length of the tubing is significantly reduced in comparison to current system, and also the design and the arrangement of the lines upstream of the relay valve are substantially simplified.

In particular, it can be provided that, at least in the first switching state, the first connecting line is connected to at least one spring accumulator of the parking brake of the utility vehicle, and therefore the first connecting line is imprinted by the at least one spring accumulator. It is thus possible to use the pressure which is present in any case in the spring accumulators of the utility vehicle pressure which is present for activating and actuating the trailer control module. This state is used in particular during parking of the utility vehicle.

The valve can have at least one second switching state in which the second connection is connected to the third connection in such a manner that the pressure from the second connecting line is present at a control connection of the trailer control module. The trailer control module can therefore be activated, specifically without the parking brake of the utility vehicle having to be released for this purpose. This is because, using this activation possibility, the trailer control module can be activated independently of the activation of the spring accumulators or independently of the pressure in the spring accumulators.

This is because, in the parking state, the intention is to be able to activate a function called "trailer test" with which the pressure signal to the trailer control module can be controlled separately. For this purpose, for the duration of the "trailer test", the control line to the trailer control module for the parking brake function of the trailer is filled with compressed air (instead of being vented) while the spring accumulators continue to be vented. It can thus be checked whether the parking brake of the towing vehicle can by itself keep the vehicle combination of towing vehicle and trailer braked on the slope if the service brake action is no longer present at the trailer. For this purpose, during the trailer test, when the parking brake of the truck is applied, the service brake of the trailer is released by the control line of the trailer control valve being supplied with compressed air. The driver checks whether the vehicle combination rolls. Only if this is not the case can the vehicle combination be parked at this location.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
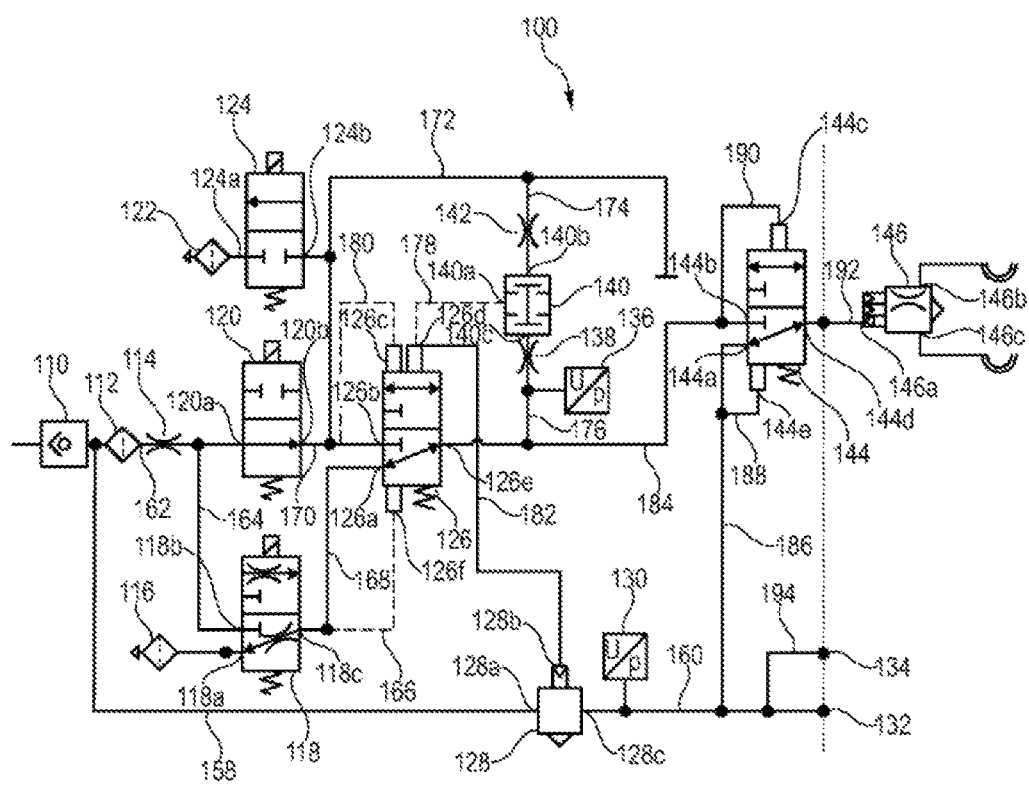
FIG. 1 shows a schematic view of an embodiment of a parking brake device according to the invention in the "parking" state.

FIG. 1 shows, in a schematic view, an exemplary embodiment of a parking brake device 100 according to the invention in the "parking" state.

The parking brake device 100 has a compressed air source (not illustrated specifically), such as, for example, a compressor of the utility vehicle, said compressed air source being connected to the line upstream of the nonreturn valve 110.

A filter 112 and a throttle 114 are arranged in the line 162 downstream of the nonreturn valve 110.

A compressed air supply line 158 branches off between filter 112 and nonreturn valve 110.

The parking brake device 100 furthermore has a 3/2 solenoid valve 118, a 2/2 solenoid valve 120, a further 2/2 solenoid valve 124 and a control valve device 126.

In addition, a relay valve 128 is provided. The relay valve 128 has connections 128a and 128c and also a control connection 128b. The relay valve 128 is also provided with a venting output.

The solenoid valve 118 has connections 118a, 118b, 118c. A venting line with a filter 116 is connected to the connection 118a. The connection 118b is connected to a line 164 which branches off from the line 162. The connection 118c is furthermore connected to a line 168.

The solenoid valve 120 has connections 120a and 120b. The connection 120a is connected here to the line 162. The connection 120b is connected to a line 170 which connected the connection 120b to a connection 126b of the control valve device 126.

The solenoid valve 124 has connections 124a and 124b. The connection 124a is connected to a venting line with a filter 122.

The control valve device 126 is provided and arranged as a bistable valve in the parking brake device 100 and is designed here as a pneumatic 3/2-way valve. The control valve device 126 has connections 126*a*, 126*b* and 126*e*.

The connection 126*a* is connected to a line 168, as a result of which the solenoid valve 118 can be connected to the control valve device 126. A line 170 is connected to the connection 126*b*, as a result of which the solenoid valve 120 can be connected to the control valve device 126. A line 184 is connected to the connection 126*e*.

In addition, the control valve device 126 has control connections 126*c*, 126*d*, 126*f*. The control connection 126*c* is connected to a control line 180 which in turn branches off from the line 170.

The control connection 126*d* is connected to the control line 178. The line 182 which is connected to a control connection 128*b* of the relay valve 128 is also connected in the region of the control connection 126*d* and of one end of the control line 128.

The control connection 126*f* is connected to a control line 166 which branches off from the line 168.

A line 174, 176, in which a throttle 138, a select-low valve 140 and a throttle 142 are arranged in this sequence, branches off from the line 184. The line 174 then leads to a line 172 which in turn is connected via a branch to the connection 124*b* of the solenoid valve 124 and is likewise connected to the line 170. A branch line also branches off from the line 176 to a pressure gauge 136.

The select-low valve 140 has connections 140*a*, 140*b* and 140*c*.

The connection 140*a* is connected to the control line 178.

The connection 128*a* of the relay valve 128 is connected to the compressed air supply line 158. The connection 128*c* of the relay valve 128 is connected to a line 160 from which a branch line leading to a pressure gauge 130 is arranged directly downstream of the relay valve 128.

Downstream of the pressure gauge 130, first of all a line or connecting line 186 branches off, followed by the connections 132 and 134, inter alia to the spring accumulators of the parking brake of the utility vehicle. The connection 134 is connected here via the line 194.

The parking brake device has a trailer control module 146. The trailer control module 146 has a control connection 146*a* for the parking brake function of the trailer, and also connections 146*b*, 146*c* to the trailer brakes.

The control connection 146*a* is connected via a line 192 to a valve 144, by which the trailer control module 146 is activatable in respect of its switching states.

The valve 144 is designed as a pneumatic 3/2-way valve.

The valve 144 has connections 144*a*, 144*b* and 144*d*, and also control connections 144*c*, 144*e*.

The connection 144*a* is connected to the line 186. A control line or branch line 188 which is connected to the control connection 144*e* also branches off from the line 186.

The connection 144*a* is therefore connected to a first connecting line 186 which is connected to a first line 160 which is arranged downstream of the relay valve 128.

The connection 144*b* is connected to the line 184. A control line or branch line 190 which is connected to the control connection 144*c* also branches off from the line 184.

The function of the parking brake device 100 can be described as follows:

FIG. 1 shows the state of the parking brake device 100 during "parking".

Figure 2:
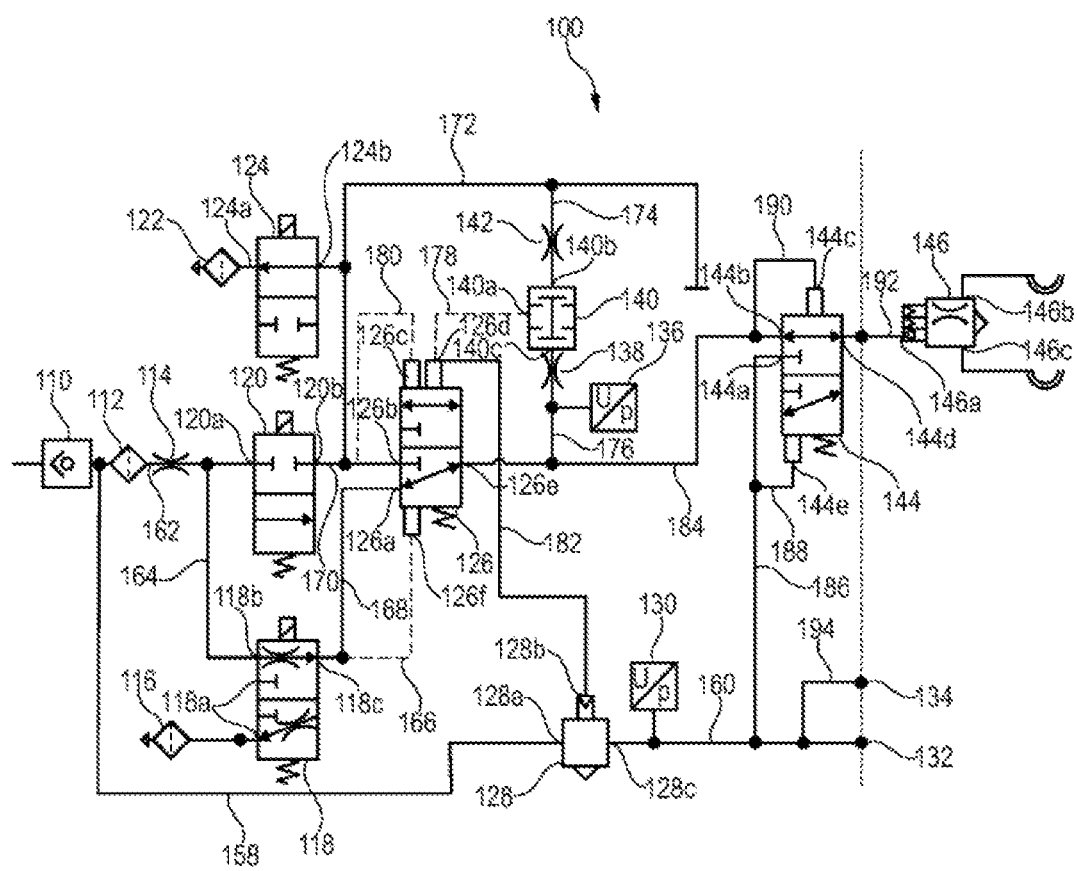
FIG. 2 shows the parking brake device according to FIG. 1 in the "trailer test" state.

FIG. 2 shows, in a schematic view, the parking brake device 100 according to FIG. 1 in the "trailer test" state.

Figure 3:
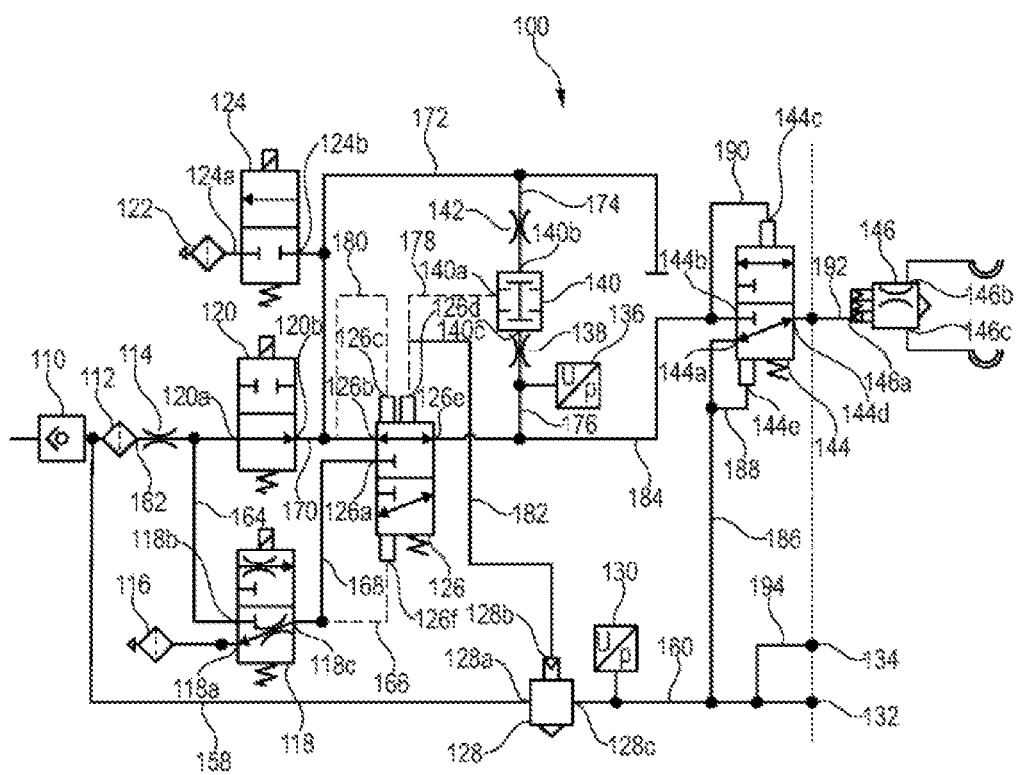
FIG. 3 shows the parking brake device according to FIG. 1 in the "driving" state.

FIG. 3 shows, in a schematic view, the parking brake device 100 according to FIG. 1 in the "driving" state.

Figure 4:
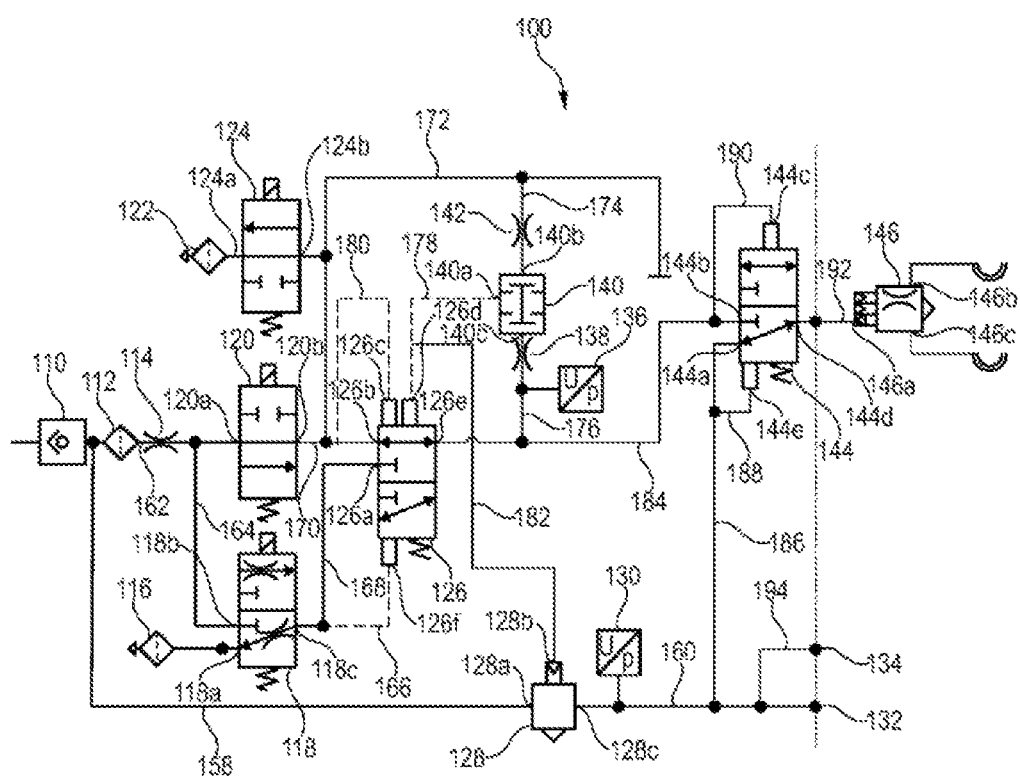
FIG. 4 shows the parking brake device according to FIG. 1 in the "graduable" state.

FIG. 4 shows, in a schematic view, the parking brake device 100 according to FIG. 1 in the "graduable" state.

The parking brake device 100 controls the parking brake function for the utility vehicle and also for the trailer.

For this purpose, in the parking brake device 100 a control pressure signal is generated which switches the position of a bistable valve, i.e. of the control valve device 126, which maintains the current position even without electricity.

The two main switching states are as follows:

Parking (see FIG. 1): below a certain threshold value of the pressure signal, the bistable valve is in the position "0" (unactuated switching state of the valve) for the parking state.

Driving (see FIG. 3): over a certain threshold value of the pressure signal, the bistable valve is in the position "1" (actuated switching state of the valve) for the driving state.

For the parking brake function of the utility vehicle, spring brake actuators are filled with compressed air or vented by means of the relay valve 128, which is activated by the above control pressure signal:

In the "parking" state (see FIG. 1), the spring accumulators are vented.

In the "driving" state (see FIG. 3), the spring accumulators are ventilated. For this purpose, the compressed air is introduced via the valve 120 into the line 172 and the line 170. The control valve device 126 is in position 1, and therefore the connection 126*b* is connected to the connection 126*c*. The control valve device 126 is therefore "switched through".

The pressure in the line 172 is higher than downstream of the control valve device 126, and therefore the select-low valve 140 is opened in the direction of the connection 140*c* and of the line 176. Compressed air flows via the connection 140*c* to the connection 140*a* and from there to the control line 178 and 182. The control connection 128*b* of the relay valve 128 is thereby actuated and "switched through". The compressed air supply line 158 is therefore connected to the line 160, and pressure is present at the connections 132 and 134 and the spring accumulators of the utility vehicle are ventilated.

In order to control the parking brake function of the trailer, the control lines 192 for the trailer control module 146 can be ventilated and vented.

In the "parking" state (see FIG. 1), the control line 192 of the trailer control module 146 is vented. The service brakes of the trailer are ventilated because of the inverse transmission behavior of the trailer control module.

In the "driving" state (see FIG. 3), the control line 192 of the trailer control module 146 is ventilated. The service brakes of the trailer ventilated.

The valve 144 is then in a first switching state in which the first connection 144*a* is connected to the third connection 144*d* in such a manner that the pressure from the first connecting line 186 is present at a control connection 146*a* of the trailer control module 146. In the first switching state, the first connecting line 186 is then connected to at least one spring accumulator of the parking brake of the utility vehicle, and therefore the first connecting line 186 is imprinted by the at least one spring accumulator.

During parking, the "trailer test" function (see FIG. 2) has to be able to be activated so that the driver can check whether the parking brake of the towing vehicle can by itself keep the vehicle combination of towing vehicle and trailer braked on the slope if the service brake action is no longer present at the trailer.

For this purpose, during the trailer test, with the parking brake of the utility vehicle applied, the service brake of the trailer is released by the control line of the trailer control module 146 being supplied with compressed air. The driver checks whether the vehicle combination rolls. Only if this is not the case can the vehicle combination then be parked at this location.

The parking brake device 100 makes it possible during parking to activate a "trailer test" with which the pressure signal to the trailer control module 146 can be controlled separately.

For the duration of the "trailer test", the control line to the trailer control module 146 has to be filled with compressed air, instead of being vented, while the spring accumulators continue to be vented.

For this purpose, use is made of the valve 144 which uses the pressure at the connection 144b as control pressure for the valve 144 (via the control line 190 and the control connection 144c). If the pressure on the inlet side exceeds a threshold value, the valve 144 switches.

In a first basic position ("parking", FIG. 1), the connection 144b is closed and the connection 144a is connected to the connection 144d. The valve 144 is kept in this first position by a spring.

In a second switched position ("trailer test", FIG. 3), the pressure prevailing at the connection 144b keeps the valve 144 in this position counter to the spring force. The connection 144b is connected to connection 144d while the connection 144a is closed.

The valve 144 is arranged in the pneumatic circuitry for the electronic parking brake device 100 in such a manner that connection 144a of the valve 144 is connected to the spring accumulators of the parking brake of the utility vehicle.

Connection 144d is connected to the control line 192 of the trailer control module 146.

The pneumatic circuitry for the electronic parking brake device 100 is designed in such a manner that it is possible to supply connection 144b with compressed air while the spring accumulators are vented.

The valve 144 is then in a switching state in which the second connection 144b is connected to the third connection 144d in such a manner that the pressure from the second connecting line 184 is present at a control connection 146a of the trailer control module 146.

The valve 144 can be designed as a slide valve 144.

Figure 5:
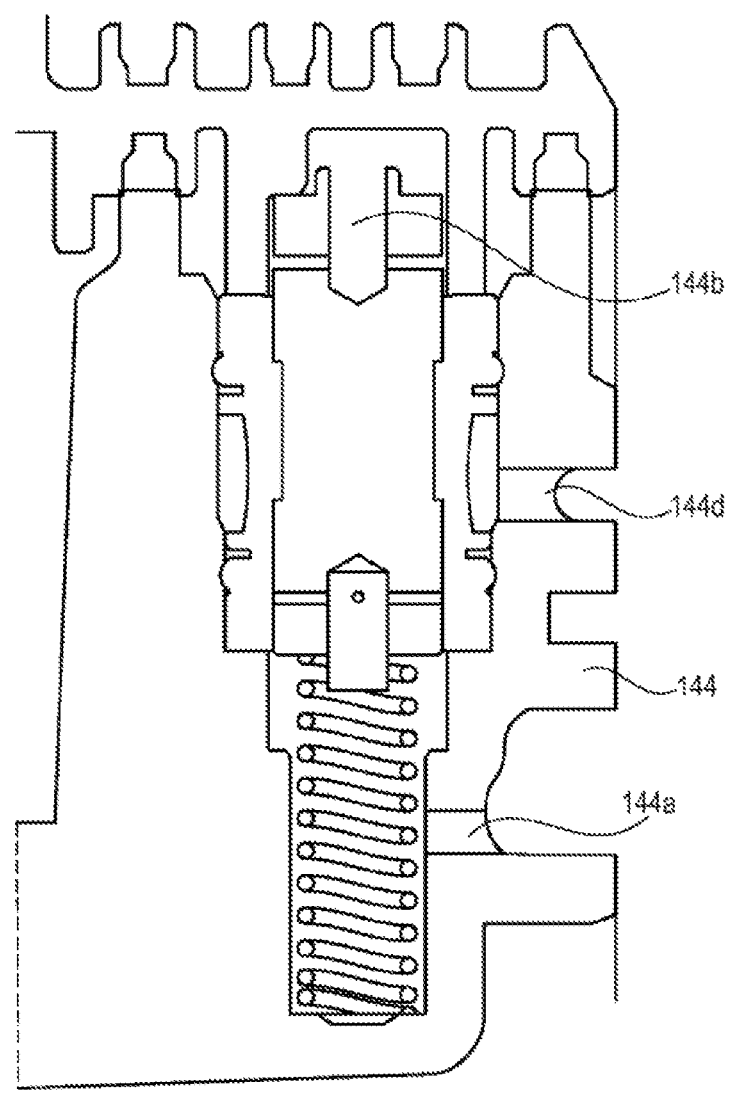
FIG. 5 shows a schematic sectional illustration of an embodiment of a slide valve for the parking brake device according to FIG. 1.

FIG. 5 shows, in a schematic sectional illustration, an exemplary embodiment of a slide valve 144 with the connections 144a, 144b, 144d.

LIST OF REFERENCE SIGNS

100 Parking brake device
110 Nonreturn valve
112 Filter
114 Throttle
116 Filter
118 Solenoid valve
118a Connection
118b Connection
118c Connection
120 Solenoid valve
120a Connection
120b Connection
122 Filter
124 Solenoid valve
124a Connection
124b Connection
126 Solenoid valve
126a Connection
126b Connection
126c Control connection
126d Control connection
126e Connection
126f Control connection
128 Relay valve
128a Connection
128b Control connection
128c Connection
130 Pressure gauge
132 Connection
134 Connection
136 Pressure gauge
138 Throttle
140 Select-low valve
140a Connection
140b Connection
140c Connection
142 Throttle
144 Valve
144a Connection
144b Connection
144c Control connection
144d Connection
144e Control connection
146 Trailer control module
146a Control connection
146b Connection
146c Connection
158 Compressed air supply line
160 Line
162 Line
164 Line
166 Control line
168 Line
170 Line
172 Line
174 Line
176 Line
178 Control line
180 Control line
182 Control line relay valve
184 Line
186 Connecting line
188 Control line, branch line
190 Control line, branch line
192 Line The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A parking brake device for a utility vehicle, comprising:
a control valve device
a relay valve;
a pneumatic brake device;
a trailer control module; and a further valve having a first connection, a second connection and a third connection, wherein the relay valve is controllable by the control valve device, the pneumatic brake device is activatable by the relay valve, the further valve is arranged upstream of the trailer control module, a first connecting line extends between the first connection of the further valve and a first relay output line downstream of the relay valve, a second connecting line extends between the second connection of the further valve and the control valve device, and a third connecting line extends between the third connection of the further valve and the trailer control module.

2. The parking brake device as claimed in claim 1, wherein the further valve is a 3/2-way valve.

3. The parking brake device as claimed in claim 2, wherein the further valve is a solenoid valve.

4. The parking brake device as claimed claim 1, wherein the further valve has a first control connection connected to the second connecting line via a first branch line.

5. The parking brake device as claimed in claim 4, wherein the further valve has a second control connection connected to the first connecting line via a second branch line.

6. The parking brake device as claimed in claim 5, wherein the further valve has at least one first switching state in which the first connection is connected to the third connection such that pressure from the first connecting line reaches a control connection of the trailer control module.

7. The parking brake device as claimed in claim 6, wherein at least in the first switching state, the first connecting line is connected to a spring accumulator of a parking brake of the utility vehicle such that a pressure in the spring accumulator is the same as the pressure in the first connecting line.

8. The parking brake device as claimed in claim 7, wherein the further valve has at least one second switching state in which the second connection is connected to the third connection such that a pressure from the second connecting line is present at the control connection of the trailer control module.

* * * * *